(12) United States Patent
Kimura et al.

(10) Patent No.: US 10,807,750 B2
(45) Date of Patent: Oct. 20, 2020

(54) ULTRASONIC SEALING APPARATUS

(71) Applicant: TOPPAN PRINTING CO., LTD., Tokyo (JP)

(72) Inventors: Yasuhiko Kimura, Tokyo (JP); Noritaka Yuhara, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 342 days.

(21) Appl. No.: 15/906,150

(22) Filed: Feb. 27, 2018

(65) Prior Publication Data

US 2018/0186487 A1    Jul. 5, 2018

Related U.S. Application Data

(63) Continuation of application No. PCT/JP2016/072813, filed on Aug. 3, 2016.

(30) Foreign Application Priority Data

Aug. 31, 2015    (JP) .................................. 2015-171187

(51) Int. Cl.
*B65B 51/22* (2006.01)
*B29C 65/00* (2006.01)
(Continued)

(52) U.S. Cl.
CPC ............ B65B 51/225 (2013.01); B29C 65/08 (2013.01); B29C 65/7443 (2013.01); B29C 65/7451 (2013.01); B29C 66/1122 (2013.01); B29C 66/346 (2013.01); B29C 66/4312 (2013.01); B29C 66/72328 (2013.01); B29C 66/7373 (2013.01); B29C 66/73921 (2013.01);
(Continued)

(58) Field of Classification Search
CPC ................................................... B65B 51/225

USPC .......................... 53/373.7; 156/580.1, 580.2
See application file for complete search history.

(56) References Cited

U.S. PATENT DOCUMENTS 4,087,297 A * 5/1978 Johnson .................. B29C 65/08
                                                              156/580.1
5,151,084 A * 9/1992 Khek ............. A61B 17/320068
                                                              604/22
(Continued)

FOREIGN PATENT DOCUMENTS

JP              61177230 A  *  8/1986 ............. B29C 65/08
JP         2002-337821 A     11/2002
(Continued)

OTHER PUBLICATIONS

Chinese Office Action issued on Chinese Application No. 2016800501623, dated Aug. 5, 2019.
(Continued)

*Primary Examiner* — Stephen F. Gerrity
(74) *Attorney, Agent, or Firm* — Foley & Lardner LLP (57) ABSTRACT

An ultrasonic sealing apparatus which allows for easy maintenance of a horn and high cooling efficiency of the horn is provided. The ultrasonic sealing apparatus includes a horn that abuts on a cylindrical material and applies vibration thereto, and a horn cover which includes a small frames that cover a lateral surface of the horn and have slits through which a space in which the horn is enclosed communicates with outside, the horn cover being removably attached independently from the horn.

4 Claims, 5 Drawing Sheets

(51) Int. Cl.
  *B29C 65/74* (2006.01)
  *B29C 65/08* (2006.01)
  *B65B 61/06* (2006.01)
  *B29L 31/00* (2006.01)
  *B65B 51/30* (2006.01)

(52) U.S. Cl.
  CPC ...... *B29C 66/8145* (2013.01); *B29C 66/8167* (2013.01); *B29C 66/81427* (2013.01); *B29C 66/81431* (2013.01); *B29C 66/81812* (2013.01); *B29C 66/849* (2013.01); *B29C 66/8491* (2013.01); *B65B 61/06* (2013.01); *B29C 66/81419* (2013.01); *B29C 66/81425* (2013.01); *B29L 2031/712* (2013.01); *B29L 2031/7166* (2013.01); *B65B 51/30* (2013.01)

(56) References Cited

U.S. PATENT DOCUMENTS

| | | | | |
|---|---|---|---|---|
| 5,188,589 | A * | 2/1993 | Wypych et al. | A61F 9/00745 604/22 |
| 5,730,832 | A * | 3/1998 | Sato et al. | B29C 65/08 156/499 |
| 5,772,100 | A * | 6/1998 | Patrikios | B06B 3/00 228/1.1 |
| 6,204,592 | B1 | 3/2001 | Hur | |
| 6,247,628 | B1 * | 6/2001 | Sato et al. | B23K 20/106 228/1.1 |
| 6,482,291 | B1 * | 11/2002 | Kume | B65B 51/225 156/553 |
| 7,802,604 | B2 * | 9/2010 | Martin et al. | B29C 65/08 156/580.2 |
| 7,854,247 | B2 * | 12/2010 | Sato et al. | B23K 20/10 156/580.1 |
| 8,621,827 | B2 * | 1/2014 | Vogler et al. | B65B 51/225 53/285 |
| 2005/0257895 | A1 * | 11/2005 | Motoda | B29C 65/08 156/580.1 |
| 2011/0196402 | A1 * | 8/2011 | Robertson et al. | A61B 17/3207 606/169 |
| 2015/0111169 | A1 * | 4/2015 | Yamamoto et al. | A61C 17/20 433/86 |
| 2016/0001498 | A1 * | 1/2016 | Voegler et al. | B65B 51/225 53/551 |
| 2016/0194103 | A1 * | 7/2016 | Shimoda et al. | B65B 51/225 156/530 |

FOREIGN PATENT DOCUMENTS

| | | | | |
|---|---|---|---|---|
| JP | 2002337821 | A * | 11/2002 | ........... B65B 51/225 |
| JP | 2011-194454 | A | 10/2011 | |
| JP | 2011194454 | A * | 10/2011 | ........... B29C 65/085 |

OTHER PUBLICATIONS

International Search Report with English translation and Written Opinion issued in International Application No. PCT/JP2016/072813 dated Nov. 1, 2016.

* cited by examiner

ULTRASONIC SEALING APPARATUS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application PCT/JP2016/072813, filed on Aug. 3, 2016, which is based upon and claims the benefit of priority of Japanese Patent Application No. 2015-171187, filed on Aug. 31, 2015, the entireties of which are hereby incorporated by reference.

TECHNICAL FIELD

The present invention relates to ultrasonic sealing apparatuses for sealing packaging materials.

BACKGROUND ART

Presently, liquid such as beverages on the market are often packed in paper packaging materials. The packaging materials for accommodating the liquid are formed into various three-dimensional shapes such as triangular pyramids, rectangular prisms, and cylindrical shapes by folding or adhesion processes. In the present specification, a packaging material after being formed is referred to as a "package". In production of such packages, for example packages of a substantially rectangular prism shape, a cylindrical shape is first formed from an elongated packaging material by overlapping and adhering both ends to each other along the longitudinal direction. Then, the cylindrical packaging material is sealed at the lower end of the cylinder, and sealed at the upper end after the contents are filled therein. The packaging material of which both ends are sealed is pressed to form a three-dimensional rectangular prism. In this present specification, sealing of the packaging material is hereinafter referred to as "sealing."

Techniques for sealing the packaging material include ultrasonic sealing. In ultrasonic sealing, a sealed portion for sealing the packaging material is sandwiched and pressed between a resonator referred to as a horn and a clamping jig referred to as an anvil. Further, ultrasonic sealing provides vibration energy to the sealed portion via the horn simultaneously with pressing to melt a thermoplastic resin on the inner surface of the packaging material and fuse the packaging materials together. An ultrasonic sealing apparatus that applies pressure to the packaging material to seal both ends is disclosed in PTL 1, for example. The ultrasonic sealing apparatus described in PTL 1 includes a folding plate provided on a casing that houses an ultrasonic generator so that the cylindrical packaging material is folded by the folding plate and formed into a package. PTL 1 describes that only the folding plate is removed from the casing in cleaning of the head of the ultrasonic sealing apparatus.

CITATION LIST

[Patent Literature] PTL 1: JP-2002-337821 A

SUMMARY OF THE INVENTION

Technical Problem

However, cleaning of the head is merely a part of maintenance of the ultrasonic sealing apparatus. For this reason, in the configuration having a folding plate removably attached to the casing, the casing is required to be disassembled or the horn along with the casing is required to be removed from the ultrasonic sealing apparatus in maintenance of a portion of the horn located behind the casing. Further, in recent years, the speed of ultrasonic sealing has been increasing more and more, and at present, 100 to 400 packages are manufactured per minute. As the processing speed of ultrasonic sealing increases, heat is generated at the horn. For cooling the heat generated at the horn, water may be used to cool the horn. However, in the conventional ultrasonic sealing apparatus in which the lateral surface of the horn is covered by the casing, water cannot be directly applied on the horn, which causes an insufficient cooling effect in reducing heat of the horn. Therefore, the higher the processing speed of ultrasonic sealing, the more important the cooling process becomes.

The present invention has been made in view of the above issues, and has an object of providing an ultrasonic sealing apparatus which allows for easy maintenance of a horn and high cooling efficiency of the horn.

Solution to Problem

In order to solve the above problem, an ultrasonic sealing apparatus of an aspect of the present invention includes a horn that abuts on a packaging material and applies vibration thereto, and a horn cover which includes a frame that covers a lateral surface of the horn and has a slit through which a space in which the horn is enclosed communicates with outside, the horn cover being removably attached independently from the horn.

Advantageous Effects of Invention

According to an aspect of the present invention, an ultrasonic sealing apparatus which allows for easy maintenance of a horn and has high cooling efficiency of the horn can be provided.

DESCRIPTION OF REPRESENTATIVE EMBODIMENTS

A representative embodiment of the present invention will be described. It will be understood that the embodiment is representative of the present invention and that the present invention is not necessarily limited to the description below.

An ultrasonic sealing apparatus of the present embodiment will be described through an example of production of a package having an appearance of a substantially rectangular prism and filled with liquid. The package exemplified in the present embodiment allows relatively long-term storage of liquid contents such as juices and alcoholic beverages or solid contents.

(Overall Configuration)

Figure 1:
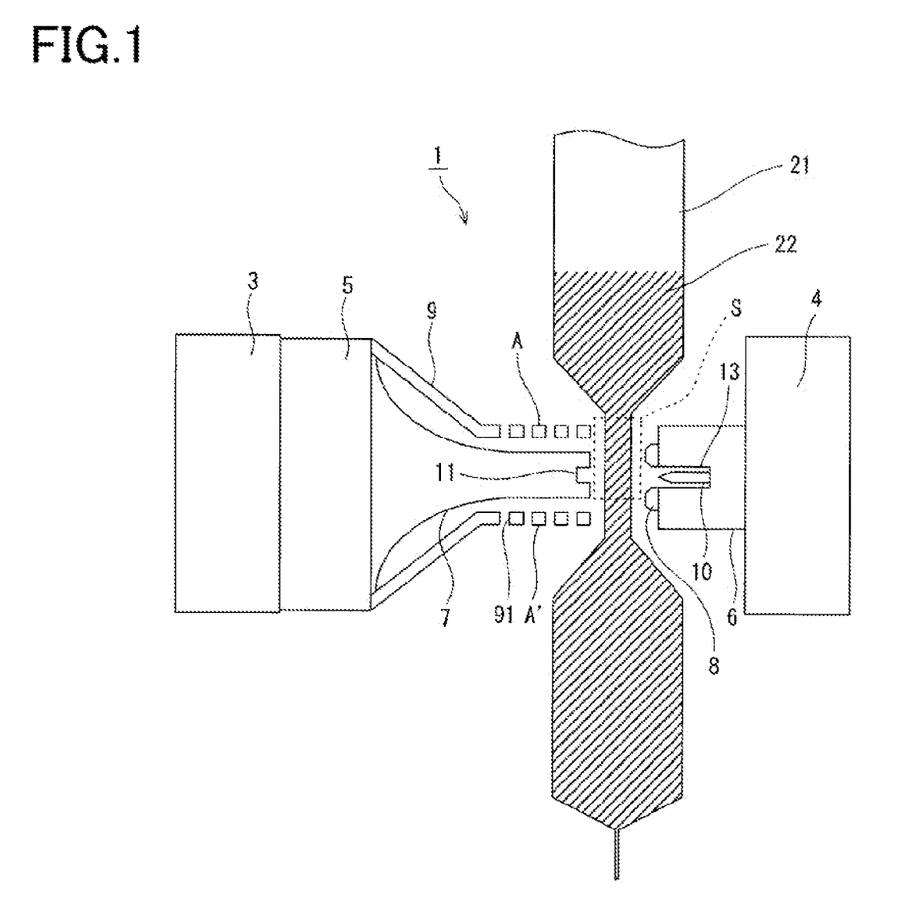
FIG. 1 is a schematic view illustrating an ultrasonic sealing apparatus of an embodiment of the present invention.

FIG. 1 is a schematic view illustrating an ultrasonic sealing apparatus 1 of the present embodiment. The ultrasonic sealing apparatus 1 includes a horn 7 that abuts and provides vibration to a cylindrical material 21, which is a packaging material formed in a cylindrical shape, an anvil 6 disposed to face the horn 7, and a horn cover 9 that covers a lateral surface of the horn 7. The horn cover 9 includes a frame having slits 91 formed as notches through which a space surrounded by the horn cover 9 (a space in which the horn 7 is enclosed) communicates with a space outside the horn cover 9. The horn cover 9 and the horn 7 are fixed to an ultrasonic generating unit 5, and the horn cover 9 is removably attached independently from the horn 7. The horn 7 and the horn cover 9, which serve as a sealing jaw, are supported by a jaw support 3 together with the ultrasonic generating unit 5. Further, an anvil 6, which serves as a sealing jaw is supported by a jaw support 4. The horn 7 along with the horn cover 9 and the anvil 6 are movable by the jaw supports 3 and 4, respectively, in the directions by which they come into contact with and separate from each other. Further, the "frame" in the present embodiment refers to a series of members (members having an endless annular shape) formed to surround a certain planar region.

The ultrasonic generating unit 5 includes an ultrasonic oscillator and a converter, which are not shown in the figure. The ultrasonic oscillator supplies electric power to the converter which is an ultrasonic transducer. The electric power supplied by the ultrasonic oscillator is converted by the converter into mechanical vibration, and then supplied to the horn 7. The horn 7 and the anvil 6 sandwich the cylindrical material 21 there between and apply pressure and vibration to the cylindrical material 21 to thereby seal the cylindrical material 21. In the present embodiment, the sealed portion of the cylindrical material 21 is hereinafter referred to as a "sealed portion S." The cylindrical material 21 is transported in one direction from top to bottom in FIG. 1 while being sealed between the horn 7 and the anvil 6.

A seal bar 8 is disposed on the surface of the anvil 6 which is configured to abut on the sealed portion S so that the seal bar 8 abuts on the cylindrical material 21 and applies pressure on the cylindrical material 21 between the horn 7 and the seal bar 8. Moreover, the anvil 6 includes a gap 13. The gap 13 is formed substantially at a center of the cylindrical material 21 in the transport direction. A cutting blade 10 which is movable toward the horn 7 is housed in the gap 13. Meanwhile, the horn 7 includes a groove 11. The groove 11 is formed at a position which faces the gap 13 of the anvil 6 so that the cutting blade 10 moving toward the horn 7 is inserted into the groove 11. As the cutting blade 10 is inserted into the groove 11, the sealed portion S of the cylindrical material 21 is cut off (Horn Cover)

Figure 2:
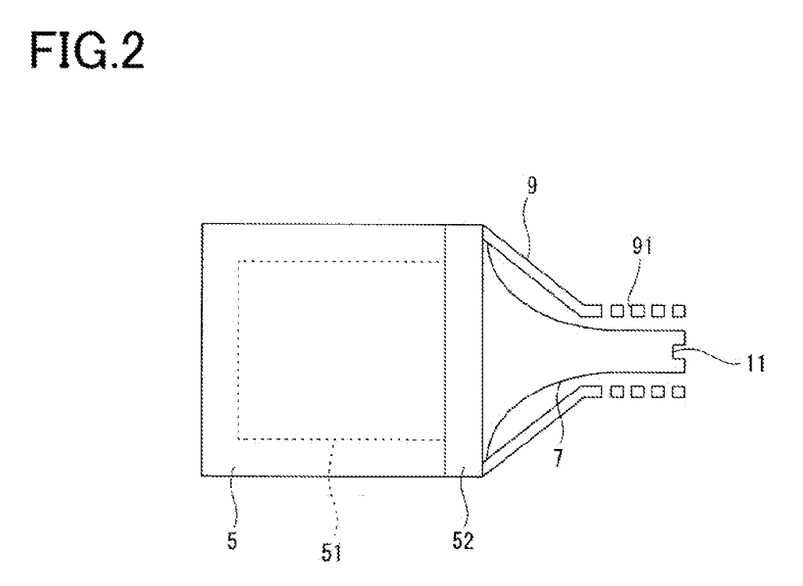
FIG. 2 is a schematic view illustrating a horn and a horn cover of FIG. 1.

FIG. 2 is a schematic view illustrating the horn 7 and the horn cover 9 of FIG. 1. The ultrasonic generating unit 5 houses an ultrasonic oscillator and a converter, which are not shown in the figure, in the case 51. A lid 52 is mounted on the case 51 to close a space in which the ultrasonic oscillator and the converter are disposed. The horn 7 and the horn cover 9 are independently fixed to the lid 52. As a result, the horn cover 9 can be removed from the lid 52 without removing the horn 7 from the lid 52. In the present embodiment, this configuration is expressed as "removably attached independently from the horn 7."

Figure 3:
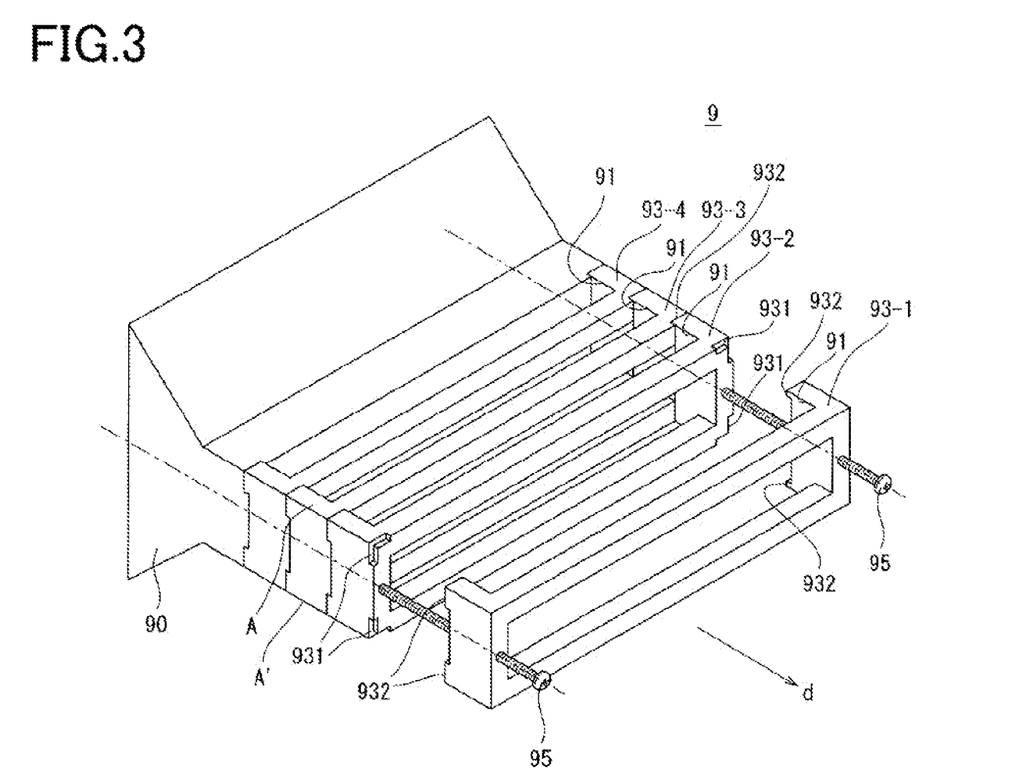
FIG. 3 is a perspective view illustrating a horn cover of FIG. 2.

FIG. 3 is a perspective view illustrating the horn cover 9. As shown in FIG. 3, the horn cover 9 includes a plurality of stacked small frames 93-1, 93-2, 93-3, 93-4, and a base 90. The plurality of small frames 93-1 to 93-4 are stacked in a stacking direction d from the base 90 toward the anvil 6, and are joined together as a unit. In the present embodiment, the plurality of small frames 93-1 to 93-4 are joined by penetrating a screw 95 coaxially through the plurality of small frames 93-1 to 93-4 and the base 90, and fastening the distal end of the screw 95 to the lid 52. Further, the small frames 93-1 to 93-4 may be made of a material such as iron, stainless steel, aluminum alloy, or titanium alloy.

The plurality of small frames 93-1 to 93-4, which have identical shapes, are a series of members that surround a rectangular plane B (members having an endless annular shape with a rectangular cross-section). The position of the plane B corresponds to a head, which is not shown, of the horn 7. However, the small frames 93-2 to 93-4, other than the small frame 93-1 located closest to the anvil 6, each have a recessed portion 931 on the surface oriented upward in the stacking direction d, and a raised portion 932 on the surface opposite to the surface on which the recessed portion 931 is formed. When the raised portion 932 and the recessed portion 931 of the adjacent frames mate with each other, the recessed portions 931 and the raised portions 932 prevent each other from being displaced. Further, the small frame 93-1 located closest to the anvil 6 has the raised portion 932 on the surface facing the small frame 93-2 so that the raised portion 932 engages the recessed portion 931 of the small frame 93-2. Further, the base 90 includes the recessed portion 931 so that the recessed portion 931 engages the raised portion 932 of the small frame 93-4.

The horn cover 9 made up of a stack of the plurality of small frames 93-1 to 93-4 has pressing surfaces A and A' shown in FIG. 3. The respective small frames 93-1 to 93-4 each have a notch 191. When the plurality of small frames 93-1 to 93-4 are joined together by the screws 95, the slits 91 are formed by the notches 191 of the adjacent small frames abutting each other. Accordingly, the horn cover 9 has the slits 91 formed on the pressing surfaces A and A'. The pressing surfaces A and A' are used for pressing the package to form a rectangular prism as described later. The slit 91 in the present embodiment extends in the direction crossing over the stacking direction d of the plurality of small frames 93-1 to 93-4, for example, in the direction perpendicular to that direction.

In the horn cover 9 shown in FIG. 3, the plurality of small frames 93-1 to 93-4 and the base 90 can be removed from the lid 52 at a time by loosening the screws 95. Accordingly, in the present embodiment, the entire horn cover 9 can be easily removed in maintenance of the horn 7. Further, according to the horn cover 9, since the plurality of slits 91 are formed on the pressing surface A, the amount of water sufficient for cooling is allowed to enter the horn cover 9 through the plurality of slits 91 when water is directly applied on the outside the horn cover 9. The water which has entered the horn cover 9 is directly in contact with the horn 7 to thereby efficiently cool the horn 7.

Moreover, air can be blown onto the horn 7 via the plurality of slits 91 of the horn cover 9 for purging to thereby remove dust and dirt adhered on the horn 7. According to this configuration, maintenance of the horn 7 can be performed without removing the horn cover 9. Further, processing and manufacturing of the horn cover 9 are relatively simple since the horn cover 9 can be formed by stacking the plurality of small frames 93-1 to 93-4 having a simple and identical basic structure. Further, in the present embodiment, the slits 91 can be formed by providing the notch 191 on the small frames 93-1 to 93-4. Accordingly, the horn cover 9 having the slits 91 can be formed in a simple manner compared with the case of forming the slits 91 by boring the wall of the integrally formed horn cover 9.

Moreover, it is known that a tip amplitude of the head of the horn 7 contributes to the sealing state of the cylindrical material 21. The horn 7 is made of metal materials, and metals have different speeds of sound inherent to their base materials. In order to optimize the tip amplitude of the horn 7, the length of the horn 7 can be modified depending on the various speeds of sound. The horn cover 9 can accommodate for various lengths of the horn 7 by adjustment of the numbers and width of frames staked. Accordingly, the present embodiment does not require production of the horn covers 9 of different shapes for each of the horns 7, but can accommodate for a plurality of horns 7 having different lengths by assembling different frames.

(Cylindrical Material)

Figure 4:
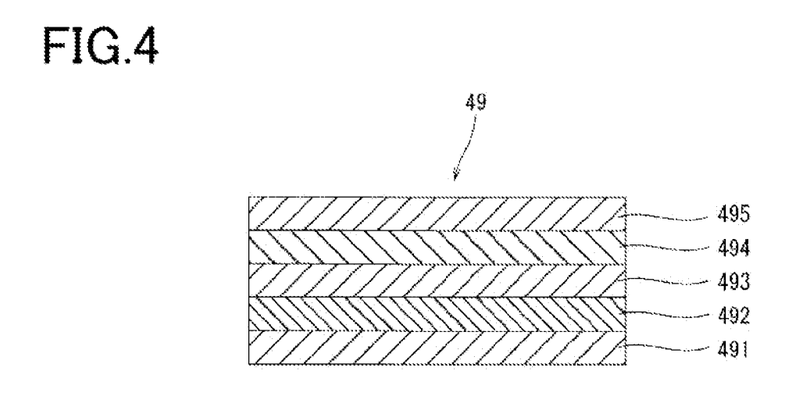
FIG. 4 is a diagram illustrating a cylindrical material of FIG. 1.

The cylindrical material 21 sealed by the horn 7 and the anvil 6 will be described. FIG. 4 is a diagram illustrating a packaging material 49 which is provided as a material for the cylindrical material 21. The packaging material 49 has a multi-layered structure of resins and papers. In the packaging material 49, a surface which faces inside the package in which contents are filled is referred to as an "inner surface," and a surface on the package surface is referred to as an "outer surface." The packaging material 49 is formed by laminating each layer of a first polyethylene (polyethylene: hereinafter, referred to as PE) resin 491, a barrier material 492, a second PE resin 493, a paper 494, and a third PE resin 495 in this order from the inner surface. The first PE resin 491 is a thermoplastic resin, and serves as an adhesive when the inner surfaces of the packaging material 49 are fused to each other. Examples of the barrier material 492 include nylons (Ny), polyvinyl alcohol (PVA), ethylene/vinyl alcohol copolymer resin (EVOH), polyvinylidene chloride (PVDC), and a mixture thereof. Further, polyethylene terephthalate (PET) formed as a vapor deposition film layer and having barrier properties or aluminum and the like may be provided as the barrier material 492.

Figure 5A:
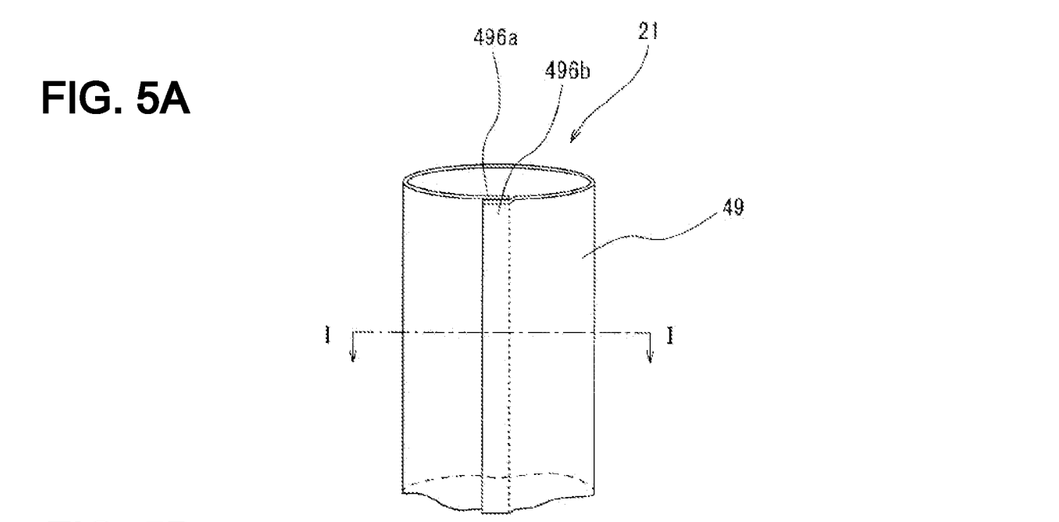
FIGS. 5A-5C are diagrams illustrating a cylindrical material of FIG. 1.
Figure 5B:
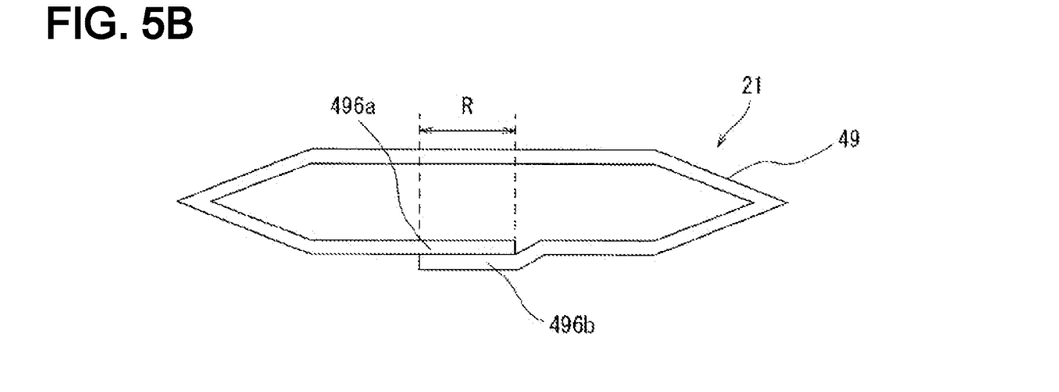
Figure 5C:
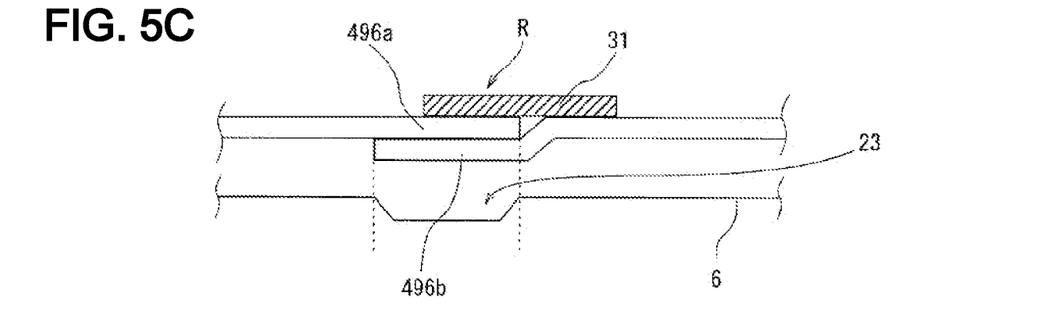

FIG. 5A-FIG. 5C are diagrams illustrating the cylindrical material 21. As shown in FIG. 5A, the cylindrical material 21 is formed by overlapping the ends 496A and 496B along the longitudinal direction of the elongated packaging material 49. Therefore, the cylindrical material 21 is also formed as an elongated member. An overlapping portion of the ends 496A and 496B is designated by reference character "R." FIG. 5B is cross-sectional view of the cylindrical material 21 taken along a line I-I extending in a short direction of the cylindrical material 21 shown in FIG. 5A. As shown in FIG. 5B, in the present embodiment, the region in which the end 496A and the end 496B overlap each other is referred to as an overlapping portion R. As shown in FIG. 5C, an edge protection tape 31 is adhered to the edge of the end 496A of the overlapping portion R. The edge protection tape 31 adheres the end 496A to the inner surface of the packaging material 49 to form the packaging material 49 into the cylindrical material 21.

The cylindrical material 21 is sealed by the horn 7 and the anvil 6. A stepped portion 23 is formed on the surface of the anvil 6 which seals the cylindrical material 21 so that the overlapping portion R is pressed by the stepped portion 23 in a sealing process. The stepped portion 23 is provided taking into consideration the thickness of the overlapping portion R being larger than that of the remaining sealed portion, and reduces the pressure exerted on the overlapping portion R and prevents the surface of the cylindrical material 21 from being damaged.

(Operation)

Next, the operation of the ultrasonic sealing apparatus of the present embodiment will be described.

Referring back to FIG. 1, the elongated cylindrical material 21 is set in the ultrasonic sealing apparatus 1, and the cylindrical material 21 is transported from top to bottom in FIG. 1 by a transport mechanism, which is not shown. By setting the transport direction of the cylindrical material 21 in the direction from top to bottom, the cylindrical material 21 moves between the horn 7 and the anvil 6 without slackening due to gravity. The horn 7 and the anvil 6 approach the cylindrical material 21 transported in the downward direction from the left and right, apply pressure by sandwiching the sealed portion S of the cylindrical material 21 and apply vibrations at a frequency based on ultrasonic waves. The first PE resin 491 melts due to the vibrations and the inner surface of the cylindrical material 21 is sealed due to the pressure.

As shown in FIG. 1, the cutting blade 10 is disposed in the gap 13 of the anvil 6. Meanwhile, the corresponding groove 11 is formed on the horn. After completing sealing, the cutting blade 10 moves toward the groove 11 and cuts the sealed portion S into the upper and lower portions. By cutting the sealed portion S, the package in which the upper end and the lower end are sealed is completed. Further, by the cutting of the sealed portion S, the cylindrical material 21 in which only the lower end is sealed is formed. Liquid contents 22 are filled in the cylindrical material 21 having only the lower end sealed. The upper end of the cylindrical material 21 in which the contents 22 are filled is sealed by the horn 7 and the anvil 6 in the same manner as stated above. The package is completed by cutting the sealed portion S with the cutting blade 10. The package is transported from upper to lower positions in the ultrasonic sealing apparatus.

In the present embodiment, two sets of units each having the horn 7 and the anvil 6 are provided so that one of the units seals the upper end of the cylindrical material 21, while the other seals and cuts the lower end of the cylindrical material 21. Then, when sealing is completed, the unit that has sealed the upper end moves downward for subsequent sealing and cutting of the lower end of the cylindrical material 21, while the other moves upward for subsequent sealing and cutting of the upper end of the cylindrical material 21. Moreover, in the present embodiment, a frame called a holding flap, which is not shown, is disposed on opposing sides from both the upper and lower sides of the horn 7 on one hand and the upper and lower sides of the anvil 6 on the other hand. After the lower end of the cylindrical material 21 is sealed and cut, the pressing surface A of the horn cover 9 of the unit that has sealed the lower end presses a portion adjacent to the sealed portion of the cylindrical material 21, which forms the top of the rectangular prism, to thereby press a portion of the cylindrical material 21 which forms a side surface of the rectangular prism against the upper holding flap. Then, after the upper end of the cylindrical material 21 is sealed and cut, the pressing surface A' of the horn cover 9 of the unit that has sealed the upper end presses a portion adjacent to the sealed portion, which forms the bottom of the rectangular prism, to thereby press a portion of the cylindrical material 21 which forms a side surface of the rectangular prism against the lower holding flap. By these operations, the sealed portion of the package is folded to form a substantially rectangular prism.

In parallel with the above operations, in the present embodiment, water is applied on the horn cover 9 to cool the horn 7. At this time, water enters the inside of the horn cover 9 through the slits 91 formed on the pressing surfaces A and A'. The water is directly in contact with the horn 7 to cool the horn 7 and prevents heat generation by the horn 7. According to the present embodiment described above, the horn 7 can be cooled from outside of the horn cover 9. Further, in the present embodiment, the horn cover 9 can be removed at one time, which facilitates maintenance of the horn 7. Further, in the present embodiment, the horn cover 9 can be purged to remove dust and the like attached on the horn 7.

Moreover, the present embodiment can accommodate a plurality of horns 7 having different lengths by assembling different frames depending on the length of the horn 7. The present embodiment described above is not limited to the aforementioned configuration. That is, in the present embodiment, the slits 91 are formed as notches of the horn cover 9. However, the notch is not limited to the slit 91, and may be in any form that allows the space of the horn cover 9 in which the horn 7 is housed to communicate with the outside. Further, as shown in FIG. 3, the slit 91 of the present embodiment extends in a direction perpendicular to the stacking direction d of the small frames 93-1 to 93-4. However, the slit may extend in any direction.

It should be noted that the drawings of the present embodiment described above are merely schematic illustrations, and thus, the relationship between the thickness of the respective parts and the two-dimensional size thereof, the ratio of the thicknesses of the layers, and the like may be different from the actual ones. Accordingly, the specific thickness and dimensional size should be determined taking into consideration the description. Further, as a matter of course, dimensional relationships and ratios may be different among the drawings. The present embodiment is merely an example of a configuration for embodying the technical idea of the present invention, and thus the technical idea of the present invention should not be construed as specifying the materials, shapes, structures, arrangements, and the like of the components. Various modifications can be made to the technical idea of the present invention within the technical scope of the claims. As a matter of course, the present invention encompasses various embodiments and the like that are not described herein. Therefore, the technical scope of the present invention is defined only by the matters defining the invention as recited in the claims which are reasonable from the above description.

INDUSTRIAL APPLICABILITY

The present invention can be applied to any field as long as it is an ultrasonic sealing apparatus for cutting off a packaging material and applying pressure to fold the packaging material.

REFERENCE SIGNS LIST

1: Ultrasonic sealing apparatus; 3, 4: Jaw support; 5: Ultrasonic generating unit; 6: Anvil; 7: Horn; 8: Seal bar; 9: Horn cover; 10: Cutting blade; 11: Groove; 13: Gap; 21: Cylindrical material; 22: Contents; 23: Stepped portion; 31: Edge protection tape; 49: Packaging material; 51: Case; 52: Lid; 90: Base; 91: Slit; 93-1, 93-2, 93-3, 93-4: Small frame; 95: Screw; 191: Notch; 491: First PE resin; 492: Barrier material; 493: Second PE resin; 494: Paper; 495: Third PE resin; 496A, 496B: End; 931: Recessed portion; 932: Raised portion

What is claimed is:

1. An ultrasonic sealing apparatus, comprising:
   a horn that abuts on a packaging material and applies vibration thereto; and
   a horn cover which includes a frame that covers a lateral surface of the horn and has a notch through which a space in which the horn is enclosed communicates with outside, the horn cover being removably attached independently from the horn,
   wherein the ultrasonic sealing apparatus further comprises an anvil disposed to face the horn, and,
   wherein the frame is composed of a plurality of small frames and the plurality of the small frames are stacked in a direction toward the anvil and joined to each other.

2. The ultrasonic sealing apparatus of claim 1, wherein the notch is a slit extending in a direction perpendicular to a stacking direction of the small frames.

3. The ultrasonic sealing apparatus of claim 1, wherein the ultrasonic sealing apparatus comprises:
   a cutting blade which is housed in a gap formed in the anvil and is movable toward the horn; and
   a groove formed in the horn at a position corresponding to the gap so that the cutting blade moving toward the horn is inserted into the groove, wherein
   a sealed portion of the packaging material is cut by the cutting blade inserted in the groove.

4. The ultrasonic sealing apparatus of claim 3, wherein the horn cover presses a portion of the packaging material which is cut after sealing.

\* \* \* \* \*